(12) United States Patent
Karlsson

(10) Patent No.: US 12,521,810 B2
(45) Date of Patent: Jan. 13, 2026

(54) OVERVOLTAGE PROTECTION FOR CURRENT BRAKING SWITCH

(71) Applicant: ESAB AB, Gothenburg (SE)

(72) Inventor: Rolf Karlsson, Laxå (SE)

(73) Assignee: ESAB AB, Gothenburg (SE)

( * ) Notice: Subject to any disclaimer, the term of this patent is extended or adjusted under 35 U.S.C. 154(b) by 710 days.

(21) Appl. No.: 17/228,761

(22) Filed: Apr. 13, 2021

(65) Prior Publication Data
US 2022/0324049 A1 Oct. 13, 2022

(51) Int. Cl.
*B23K 9/10* (2006.01)
*H01C 7/12* (2006.01)

(52) U.S. Cl.
CPC .......... *B23K 9/1043* (2013.01); *B23K 9/1031* (2013.01); *H01C 7/126* (2013.01)

(58) Field of Classification Search
CPC .. B23K 9/1006; B23K 9/1012; B23K 9/1043; B23K 9/1031
USPC .............................. 219/137 R, 137 PS, 130.1
See application file for complete search history.

(56) References Cited

U.S. PATENT DOCUMENTS

| | | | |
|---|---|---|---|
| 4,835,360 A * | 5/1989 | Parks ..................... | B23K 9/091 219/130.21 |
| 5,991,169 A | 11/1999 | Kooken | |
| 7,081,598 B2 * | 7/2006 | Ilic ..................... | H01J 37/32027 219/121.43 |
| 7,265,320 B2 | 9/2007 | Ou | |
| 7,280,331 B2 | 10/2007 | Samodell | |
| 8,217,299 B2 | 7/2012 | Ilic et al. | |
| 8,395,078 B2 | 3/2013 | Ilic | |
| 8,440,936 B2 | 5/2013 | Aberg et al. | |
| 8,884,180 B2 | 11/2014 | Ilic | |
| 9,120,175 B2 | 9/2015 | Peters et al. | |
| 9,578,692 B2 | 2/2017 | Ribarich et al. | |
| 10,205,380 B2 | 2/2019 | Ribarich et al. | |
| 2008/0203070 A1 * | 8/2008 | Ilic ..................... | H01J 37/32174 219/121.57 |

(Continued)

FOREIGN PATENT DOCUMENTS

| | | | |
|---|---|---|---|
| CN | 112091369 A | * 12/2020 | ........... B23K 9/1056 |
| WO | 2016205476 A1 | 12/2016 | |

OTHER PUBLICATIONS

Notification of Transmittal of International Search Report and Written Opinion including International Search Report and Written Opinion for International Application No. PCT/IB2022/053289 dated Jul. 22, 2022, 14 pages.

(Continued)

*Primary Examiner* — Steven W Crabb
*Assistant Examiner* — Alba T Rosario-Aponte
(74) *Attorney, Agent, or Firm* — Edell, Shapiro & Finnan, LLC

(57) ABSTRACT

A method includes supplying a welding current to a welding zone, monitoring, during a welding current ramp down period of a given short arc welding process cycle, a voltage across a current braking switch that is in an open state and that causes a decrease in welding current being supplied to a welding zone; and when the voltage across the current braking switch that is in the open state reaches a first predetermined voltage threshold, closing the current braking switch before a completion of the welding current ramp down period of the given short arc welding process cycle.

17 Claims, 6 Drawing Sheets

(56) References Cited

U.S. PATENT DOCUMENTS

| | | |
|---|---|---|
| 2014/0368133 A1 | 12/2014 | Nakano et al. |
| 2017/0317628 A1 | 11/2017 | Renner |
| 2018/0036822 A1 | 2/2018 | Schartner et al. |
| 2019/0084073 A1 | 3/2019 | Wang et al. |

OTHER PUBLICATIONS

Examination Report for European Patent Application No. 22716526.3 dated Feb. 2, 2025, 5 pages.

* cited by examiner

OVERVOLTAGE PROTECTION FOR CURRENT BRAKING SWITCH

BACKGROUND

Metal Inert Gas (MIG)/Metal Active Gas (MAG) welding are welding processes where an electrode is continuously fed toward a workpiece. An electric power source generates a welding voltage and a welding current. During the welding process, the workpiece is heated primarily by an arc generated by the power source. The electrode is heated, partly by the power developed in the electrode as the weld current flows through an electrode stick out, and partly by the heat developed by the arc itself. The electrode stick out is a part of the welding wire between a free wire end and a contact tip, where the current transfer to the electrode takes place. An inert or active gas is fed through the torch and surrounds the weld pool and arc, thus keeping oxygen and any related by-products from contaminating the resulting weld. A basic control of the welding process aims to achieve an electrode melting speed which corresponds to the electrode feed speed. Another basic control of the welding process is to enable the welding process to operate in a desired metal transfer mode. Further objects of the control may be, for instance, to influence the amount of heat transferred to the workpiece.

MIG/MAG-welding takes place in one of three basic metal transfer modes: short arc, mixed arc, and spray. In the short arc welding mode, the material transport from the electrode to the workpiece takes place through short-circuiting droplets.

When the supplied power is increased, the process passes into the mixed arc mode, where material transport takes place through a mixture of short-circuiting and non-short-circuiting droplets. The result is an unstable arc that is difficult to control with a risk for much weld spatter and weld smoke. Welding in this mode is normally avoided.

At a sufficiently high supplied power, the process enters the spray mode, where the material transport takes place through small finely dispersed droplets without short circuits. The spatter quantity is lower than in short arc welding. The heat supply to the base material in this mode is greater and the method is suitable primarily for thicker workpieces.

In reference again to the short arc metal transfer mode, portions of a welding cycle constituting a short circuit condition are followed by an arcing condition. During the short circuit condition, a molten metal ball formed on the end of the advancing welding wire engages the molten metal pool on the workpiece causing a high current flow through the consumable welding wire and molten metal ball. This short circuit condition is terminated by an electrical pinch action causing the metal forming the molten ball on the wire to electrically constrict and then break away from the welding wire in an explosion type action often referred to as a "fuse" or "the fuse". Controlling current flow during the short circuit portion of the welding cycle is accomplished by a power supply control circuit. A premonition circuit is usually provided so that a given increase in dv/dt (i.e., the change of voltage over time) signals the imminent formation of the fuse. Consequently, the welding current can be decreased to a background level, or lower, immediately before the fuse occurs. In this way, the energy of the fuse during each welding cycle is drastically reduced. This, in turn, reduces spatter at the termination of the short circuit condition.

In order to quickly decrease the current being supplied at the appropriate moment, i.e., just before the fuse, a switch, disposed in the ordinary current path toward a welding zone, may be turned off thereby forcing the current to instead pass through a resistor which increases the voltage drop in the overall welding circuit thus causing the welding current to more quickly ramp down to a lower level. This switching approach may be referred to as "current braking."

The embodiments described herein improve upon current braking techniques.

SUMMARY

Disclosed herein are techniques for protecting a current braking switch from an overvoltage condition. A method includes supplying welding current to a welding zone, monitoring, during a welding current ramp down period of a given short arc welding process cycle, a voltage across a current braking switch that is in an open state and that causes a decrease in the welding current being supplied to the welding zone, and when the voltage across the current braking switch that is in the open state reaches a first predetermined voltage threshold, closing the current braking switch before a completion of the welding current ramp down period of the given short arc welding process cycle.

An apparatus is also disclosed. The apparatus may include a power supply that is configured to supply welding current to a welding zone, and a brake switch voltage monitoring circuit configured to: monitor, during a welding current ramp down period of a given short arc welding process cycle, a voltage across a current braking switch that is in an open state and that causes a decrease in the welding current being supplied to the welding zone, and when the voltage across the current braking switch that is in the open state reaches a first predetermined voltage threshold, close the current braking switch before a completion of the welding current ramp down period of the given short arc welding process cycle.

BRIEF DESCRIPTION OF THE DRAWINGS

Like numerals identify like components throughout the figures.

DETAILED DESCRIPTION

Figure 1:
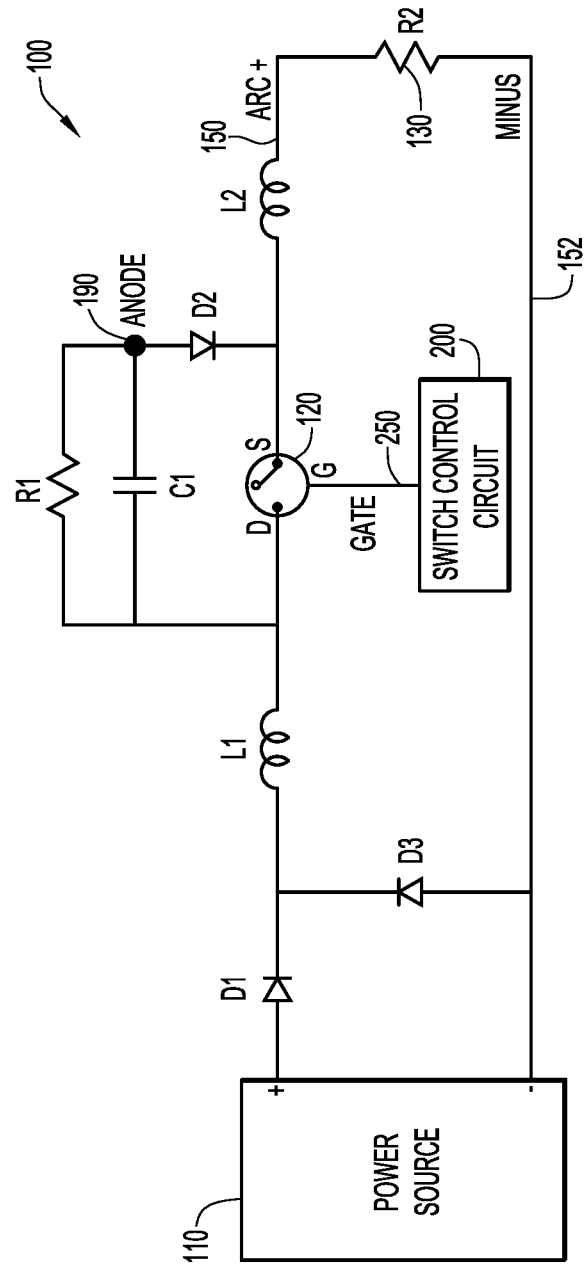
FIG. 1 is a schematic diagram of a welding power supply with a current braking switch controlled by a switch control circuit according to an example embodiment.

FIG. 1 is a schematic diagram of a welding power supply with a current braking switch controlled by a switch control circuit according to an example embodiment. The power supply 100 includes a power source 110, a current brake, i.e., current braking switch 120, or more simply switch 120, and a welding zone 130. Power source 110 may be inverter and/or transformer based. An output of the power source 110 may be rectified by a diode D1. Inductor L1 represents internal inductance of the power supply 100. Resistor R1 and capacitor C1 are connected in parallel with one another and in series with diode D2. That combination is connected in parallel with switch 120. R1 is used to discharge capacitor C1, but those skilled in the art will appreciate that another form of energy recovery circuit could replace resistor R1. Inductor L2 represents inductance of welding cables 150, 152. Resistor R2 represents the resistance of the welding zone 130, i.e., the resistance between a consumable wire and the workpiece (not shown).

Switch 120 may be a metal oxide semiconductor field-effect transistor (MOSFET) having drain (D), source (S) and gate (G) terminals. As shown in the figure, a switch control circuit 200 controls the gate G of switch 120, and thus the operation (driven open or closed) of switch 120.

Switch 120, added in series with the welding current, and even when in an on state, adds a non-zero voltage drop, and therefore power loss to the power supply 100. Therefore, it is advantageous that switch 120 have as low conduction loss as possible. The switch control circuit 200 described herein makes it possible to better optimize switch 120 in terms of both voltage rating and conduction loss. As will be apparent to those skilled in the art, implementing switch control circuit 200 along with its related advantages, may help to keep a heat sink associated with switch 120 relatively small, and may also help to keep the efficiency of the power supply 100 relatively high (as a result of less conduction loss).

Adding extra margin in voltage rating for a semiconductor switch to handle worst case load conditions usually leads to higher voltage drop when the switch is in a conducting state, i.e., a higher voltage rating usually means higher conduction loss. By using the switch control circuit 200 described herein it is possible to select a MOSFET-based transistor switch 120 with lower voltage rating, and thus better (lower) overall conduction loss. This is accomplished by protecting switch 120 from overvoltage at the worst case load conditions instead of selecting switch 120 for the highest peak voltage that might appear over the switch 120 without such overvoltage protection.

For a short arc current brake circuit, the peak voltage over switch 120 is highest when the switch 120 turns off a high peak current and the inductance (L1 plus L2) in the welding circuit is high (e.g., as a result of long and/or wound welding cables 150, 152). In such a case, and in accordance with an example embodiment, switch control circuit 200 detects that the voltage over switch 120 has reached a trigger level or threshold voltage and, in turn, switch control circuit 200 operates to turn on switch 120, during a given short arc current braking cycle, and thus protect switch 120 from an overvoltage condition. In this example, switch 120 conducts for a period of time as a result of the overvoltage protection provided by switch control circuit 200 (i.e., turning switch 120 on), and during this period of time capacitor C1, arranged in parallel with switch 120, discharges whereupon switch control circuit 200 turns off switch 120 (within the same given short arc current braking cycle) until the current in the welding circuit has ramped down to a desired level.

Figure 2:
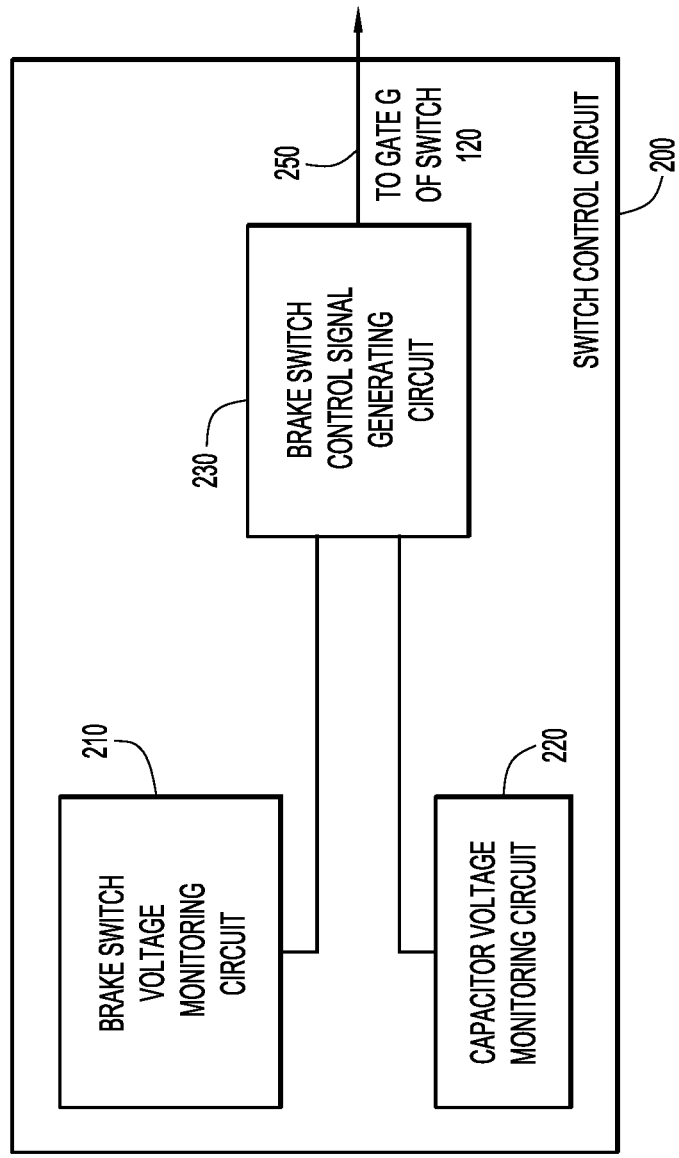
FIG. 2 is a block diagram of the switch control circuit according to an example embodiment.

FIG. 2 is a block diagram of switch control circuit 200 according to an example embodiment. As shown, and consistent with the description above, switch control circuit 200 includes a brake switch voltage monitoring circuit 210, a capacitor voltage monitoring circuit 220, and a brake switch control signal generating circuit 230. Brake switch voltage monitoring circuit 210 is configured to detect an overvoltage condition across switch 120 when switch 120 is open, and is performing current braking during individual cycles of a short arc welding process. At the same time, capacitor voltage monitoring circuit 220 detects when a voltage across capacitor C1 is sufficiently low to allow switch 120 to open again (and resume current braking). Switch control signal generating circuit 230 receives outputs of brake switch voltage monitoring circuit 210 and capacitor voltage monitoring circuit 220 and, in turn, generates a control signal that is applied to the gate terminal of switch 120. Those skilled in the art will appreciate that switch control circuit 200 may also be configured to be responsive to, e.g., the slope of dv/dt across R2 in welding zone 130 to effect precisely when to initially open switch 120 to reduce spatter in the context of short arc welding. The technique described herein might be considered to therefore override the timing for opening and closing switch 120 for conventional current braking. That is, switch control circuit 200 is configured to acutely protect switch 120 from sporadic overvoltage conditions that may occur in the normal operation of the short arc welding mode, especially due to welding cable length/winding scenarios.

Figure 3:
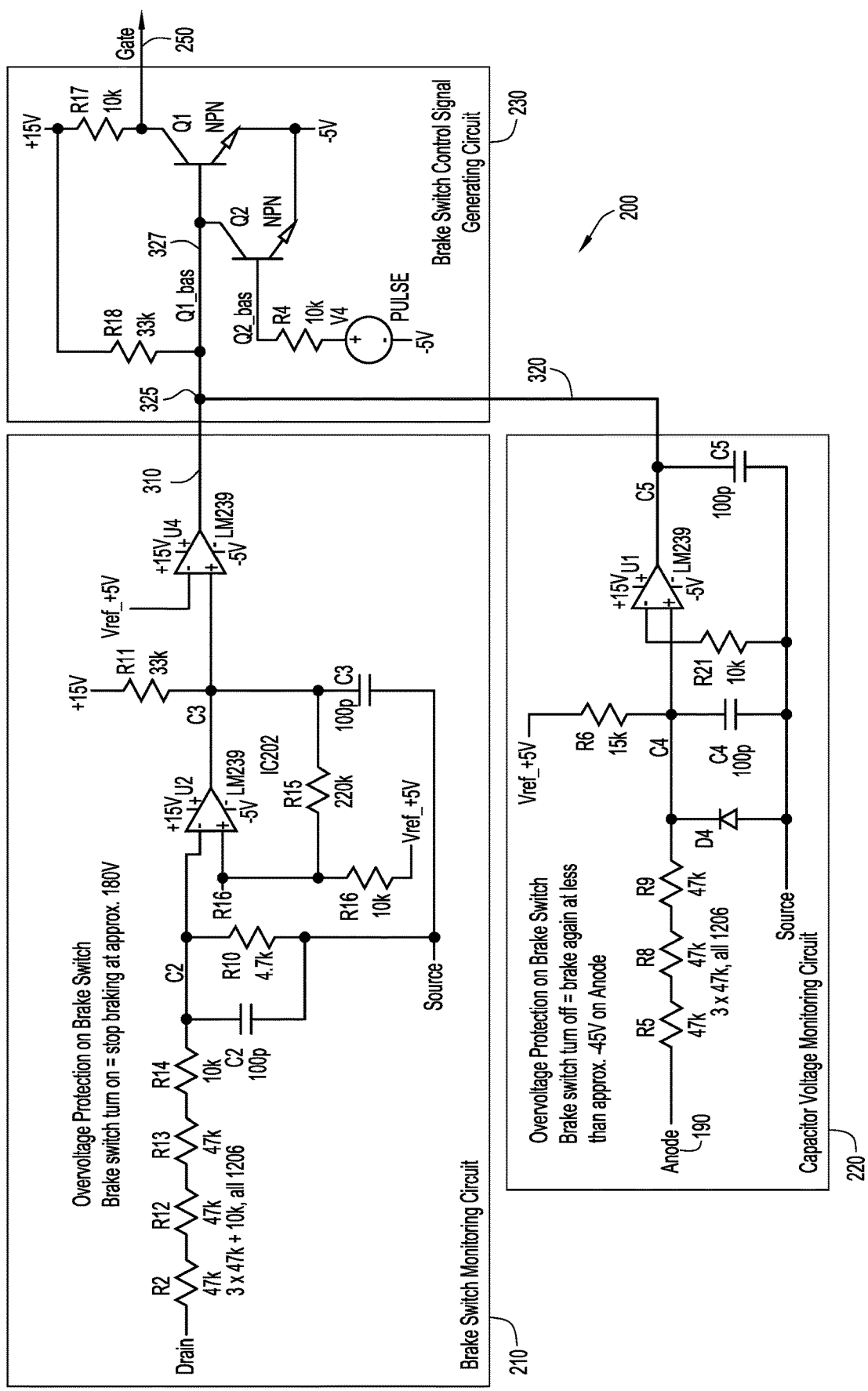
FIG. 3 is a schematic diagram of the switch control circuit according to an example embodiment.

FIG. 3 is a schematic diagram of one possible implementation for switch control circuit 200 according to an example embodiment. Those skilled in the art will appreciate that other circuit topologies, including those that rely more on digital techniques, can be used to implement the switch control circuit 200 described herein. Moreover, the component values identified in FIG. 3 might be selected differently to achieve a more robust output 250, i.e., gate control signal, described below. As shown, brake switch voltage monitoring circuit 210 includes a first comparator U2 whose inverting input is tied to the drain terminal D of switch 120 via several series-connected resistors R2, R12, R13, R14. The inverting input of comparator U2 is also connected to the parallel connection of capacitor C2 and resistor R10, which are tied to the source terminal S of switch 120. The non-inverting input of comparator U2 is connected to a voltage divider comprising resistors R15, R16, powered through pull-up resistor R11, which is connected to a voltage source, e.g., +15V. One terminal of resistor R16 is connected to a reference voltage Vref, e.g., +5V. A capacitor C3 filters the output of comparator U2.

The output of comparator U2 is fed to the non-inverting input of comparator U4, and the reference voltage Vref (e.g., +5V) is supplied to the inverting input of comparator U4. The output 310 of comparator U4 is the output of brake switch voltage monitoring circuit 210. With the component values selected as shown in FIG. 3, including switch 120 with, e.g., a 200V maximum voltage rating, when Vds (drain to source voltage) reaches, e.g., about 180V when switch 120 is open, an output of switch control circuit 200 is configured to turn on switch 120, thereby alleviating a potential overvoltage condition.

Capacitor voltage monitoring circuit 220 is configured to monitor a voltage across capacitor C1 by monitoring the voltage of the anode 190 of diode D2 with respect to the source terminal S of switch 120 when it is conducting. Capacitor voltage monitoring circuit 220 includes several series-connected resistors R5, R8, R9 connected between anode 190 and the non-inverting input of comparator U1. The reference voltage Vref (e.g., +5V) is also applied to the non-inverting input of comparator U1 via resistor R6, with capacitor C4 acting as a filter. Diode D4 protects the non-inverting input of comparator U1 from going too negative The inverting input of comparator U1 is connected, via resistor R21, to the source terminal S of switch 120 and an output 320 of comparator U1, with capacitor C5 acting as a filter at output 320. Output 320 is the output of capacitor voltage monitoring circuit 220.

The output 310 of brake switch voltage monitoring circuit 210 and the output 320 of capacitor voltage monitoring circuit 220 are combined (e.g., summed) and function, effectively, as inputs to an OR circuit (brake switch control signal generating circuit 230), to cause the switch 120 to conduct if one of output 310 or output 320 is low such that node 325 will be low, causing transistor Q1 to turn off, and thus causing output 250 to go high, thus turning on switch 120, which then protects itself. It is noted that the outputs of the comparators U1, U4 are open collector which can sink but not source current. The combined signal 327 is supplied to the base of transistor Q1 and the collector of transistor Q2, i.e., the base of transistor Q1 and the collector of transistor Q2 are tied together. A +15V supply is applied to the collector of transistor Q1 via resistor R17 and to node 325 via resistor R18. The emitters of transistor Q1 and transistor Q2 are tied together and fixed at −5V. The base of transistor Q2 is fed by the ordinary Brake Control Signal used to control current braking during a given short arc cycle. That is, V4 in the brake switch control signal generating circuit 230 controls the ordinary Bake Control Signal. To brake (under ordinary conditions), transistor Q2 is turned off (e.g., pulsed off), and transistor Q1 will then receive its base current through resistor R18 and turns on. Output 250 of switch control circuit will thus go low and turn off switch 120, i.e., current braking is implemented. Output 250 of switch control signal generating circuit 230 is taken from the collector of transistor Q1 and applied to the gate G of switch 120.

As seen in FIG. 3, the voltage rails for the comparators U1, U2, U4 are −5V and +15V. As such, the reference to "low" and "high" outputs of the comparators U1, U2, U4 in the discussion below may correspond, respectively, to those voltage levels. In operation, assume the drain voltage of switch 120 is in an overvoltage state (i.e., at, or over, 180V in this example). This state forces the output of comparator U2 low, which, in turn, forces the output of comparator U4 low, which turns off transistor Q1, causing the output 250 of switch control circuit 200 to be high (in view of supply voltage +15V delivered via R17), thereby turning on switch 120 and alleviating the overvoltage condition. During non-braking operation, the voltage on the anode 190 will be, at the time of detecting the overvoltage state, approximately −180V. In this state, the output 320 of comparator U1 is also low (just like the output 310 of comparator U4), ensuring that the switch 120 will close (i.e., turn on) and alleviate the overvoltage condition.

Because such an overvoltage condition may only be sporadic, and once the switch 120 is closed the overvoltage condition will most likely be cleared, it is still desirable to again re-brake (turn off, or open, switch 120) within a same short-arc welding process cycle in which the overvoltage condition first appeared. This is accomplished, in accordance with an example embodiment, by monitoring voltage across capacitor C1 (FIG. 1). When the overvoltage condition is detected (e.g., at or greater than 180V), the voltage at the anode 190 will be approximately negative (−) 180V with respect to the source S of switch 120. When switch 120 is closed, the voltage at anode 190 will increase, i.e., the voltage goes less negative. In the embodiment of FIG. 3, once the voltage across capacitor C1 decreases to a predetermined level, the output 320 of capacitor voltage monitoring circuit 220 will be high. Both output 310 and output 320 need to be high to cause transistor Q1 to turn on. Output 310 is already high because switch 120 is conducting and shorting the voltage on drain D of switch 120. A high output 310 and a high output 320 causes transistor Q1 to turn on, and making output 250 (which controls the gate of switch 120) to be low, and thus causing switch 120 to open again (and re-brake the welding current). This cycling of switch 120 can occur several times during the course of a given short-arc welding process cycle, and more specifically during the welding current ramp down period of the cycle.

Figure 4A:
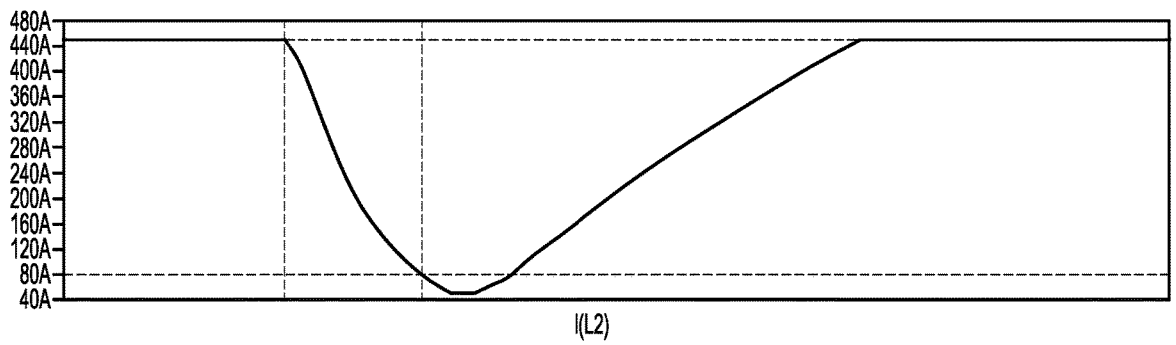
FIGS. 4A-4D are graphs showing various circuit parameters that do not cause the switch control circuit to close the current braking switch according to an example embodiment.
Figure 4B:
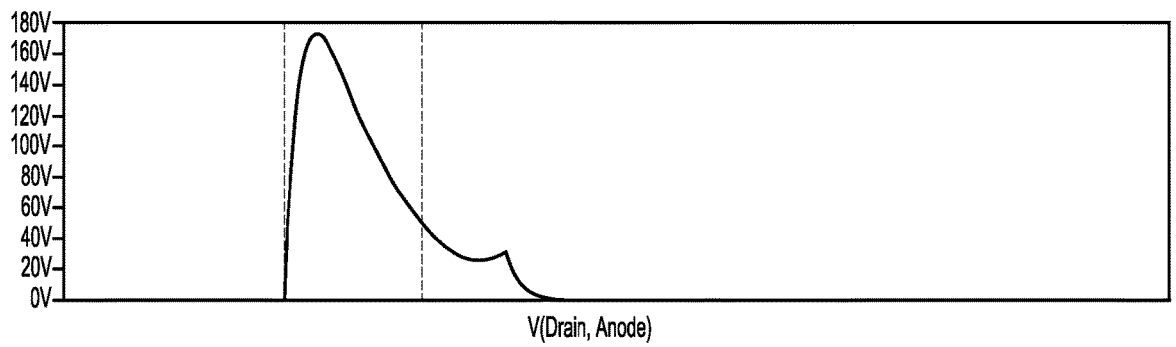
Figure 4C:
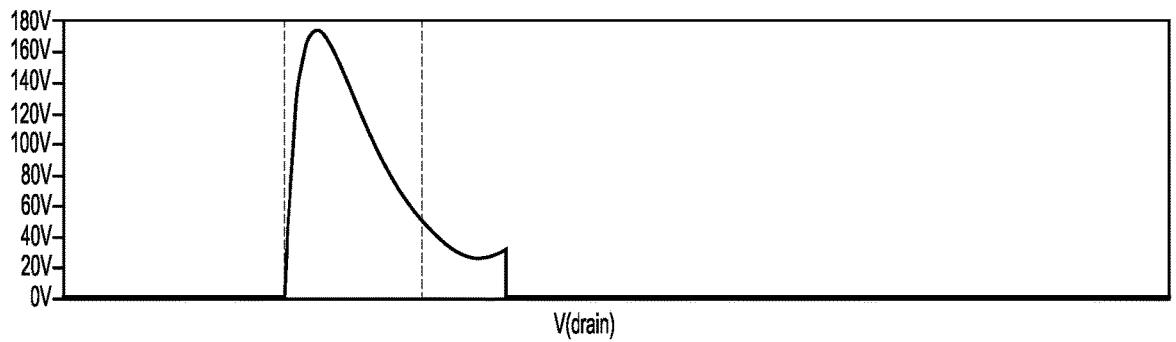
Figure 4D:
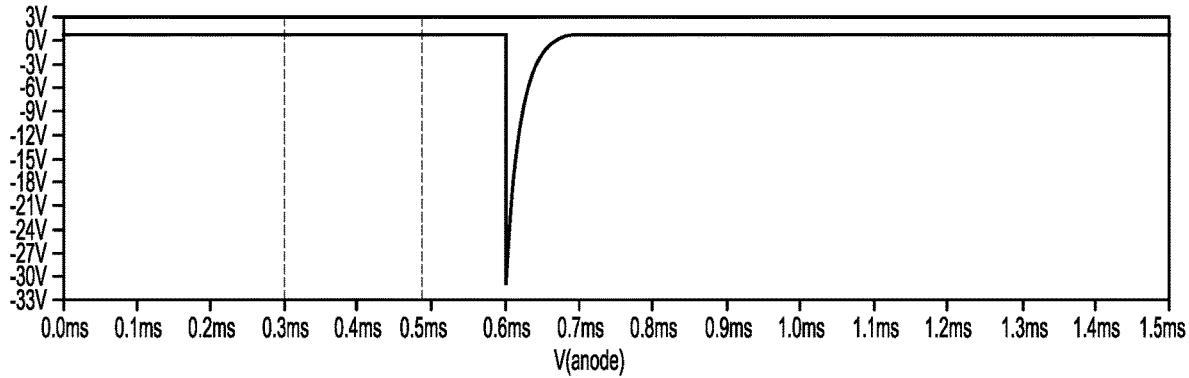

FIGS. 4A-4D are graphs showing various circuit parameters that do not cause the switch control circuit to close the current brake switch according to an example embodiment. More specifically, and in connection with the example embodiment of FIG. 3, at 0.3 ms, switch 120 opens and current through L2 (i.e., welding current) decreases (FIG. 4A) as a result of current braking. At the same time, voltage across capacitor C1 (drain to anode 190) quickly rises (FIG. 4B) as does the voltage across the switch 120 (FIG. 4C). However, those voltages do not exceed the 180V threshold at which overvoltage protection of switch control circuit 200 is activated in this example. At around 0.6 ms, switch 120 closes after the ramp down period, causing the voltage at anode 190 to quickly decrease and then ramp back up, as shown in the graph of FIG. 4D. In the context of the embodiments described herein, a part of a given short arc welding process cycle (i.e., arc time+short circuit time, which is approximately 8-10 ms) may be considered to be the period from, e.g., 0.3 ms to 1.1 ms, which is a period of time between welding current delivery peaks, of about 440 A in the example of FIG. 4A. And, a welding current ramp down period, caused by current braking, in the given short arc welding process cycle may be considered to be the period from, e.g., 0.3 ms to about 0.48 ms, i.e., the time the welding current reaches a predetermined level, such as 80 A in FIG. 4A.

Figure 5A:
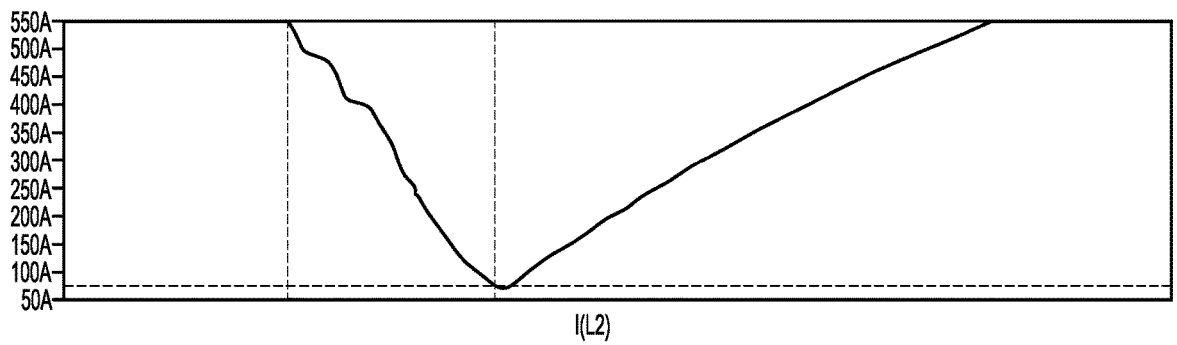
FIGS. 5A-5D are graphs showing various circuit parameters that do cause the switch control circuit to close the current braking switch according to an example embodiment.
Figure 5B:
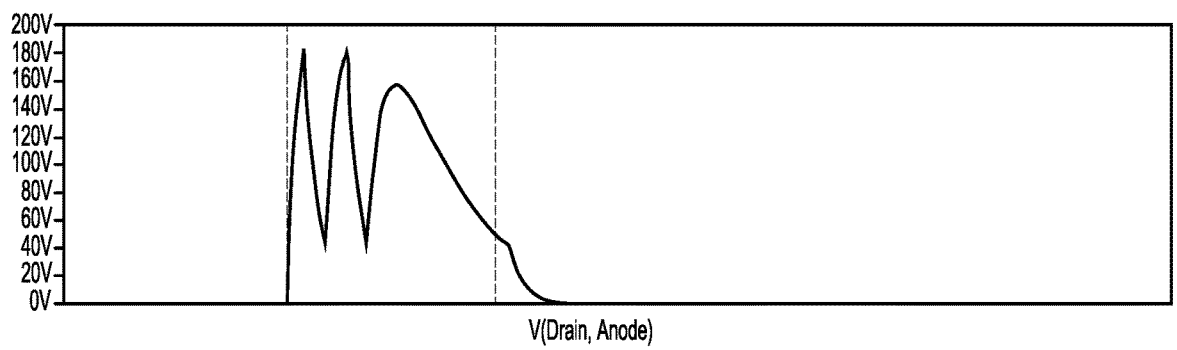
Figure 5C:
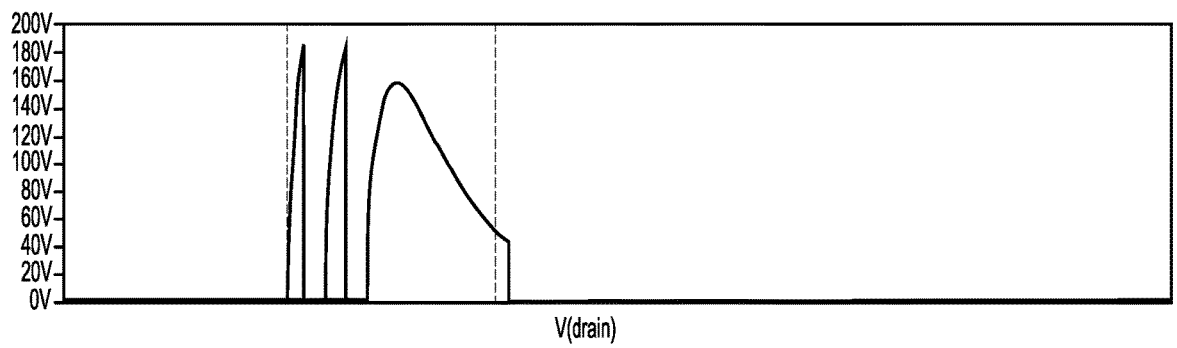
Figure 5D:
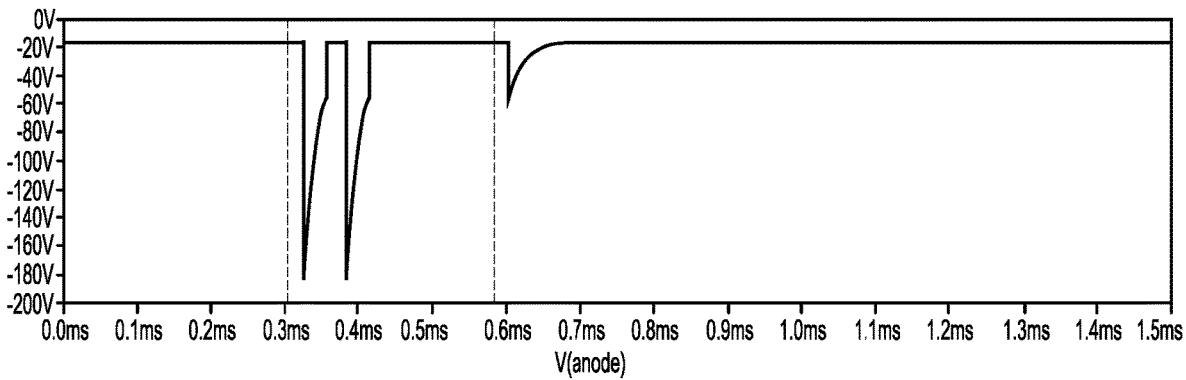

FIGS. 5A-5D are graphs showing various circuit parameters that do cause the switch control circuit 200 to close switch 120 according to an example embodiment. More specifically, and in connection with the example embodiment of FIG. 3, at 0.3 ms, switch 120 opens for current braking, and current through L2 (i.e., welding current) therefore decreases (FIG. 5A). At the same time, voltage across capacitor C1 (drain to anode 190) quickly rises (FIG. 5B) as does the voltage across the switch 120 (FIG. 5C). In this example, these voltages hit the 180V overprotection threshold or trigger, and thus switch control circuit 200 operates to close switch 120 and alleviate the overvoltage condition. Given the closure of switch 120, FIGS. 5B and 5C then show a quick decrease of voltage across (clamping) capacitor C1 (drain to anode 190) and across switch 120. When the voltage at the anode 190 increases and reaches, e.g., −45V (from −180V) (FIG. 5D), switch control circuit 200 causes switch 120 to again open (and brake the welding current). This action causes the voltage across capacitor C1 (drain to anode 190) (FIG. 5B) and the voltage across the switch 120 (FIG. 5C) to again quickly rise. As can be seen in the figures, overvoltage protection is activated twice. The welding current, as can be seen in FIG. 5A, continues to decrease during the overvoltage protection (switch closed) period, but at a slower rate.

Thus, as will be appreciated by those skilled in the art, the switch control circuit 200 described herein is configured to monitor for an overvoltage condition across the current braking switch 120 and, during a current ramp down period of a given short arc welding process cycle, quickly toggle switch 120 to avoid damaging the switch 120, yet still provide current braking functionality. Because overvoltage conditions may be rare, switch control circuit 200 can be used to help protect a lower voltage rated current braking switch than might otherwise be selected, resulting in improved efficiency for the power supply.

Figure 6:
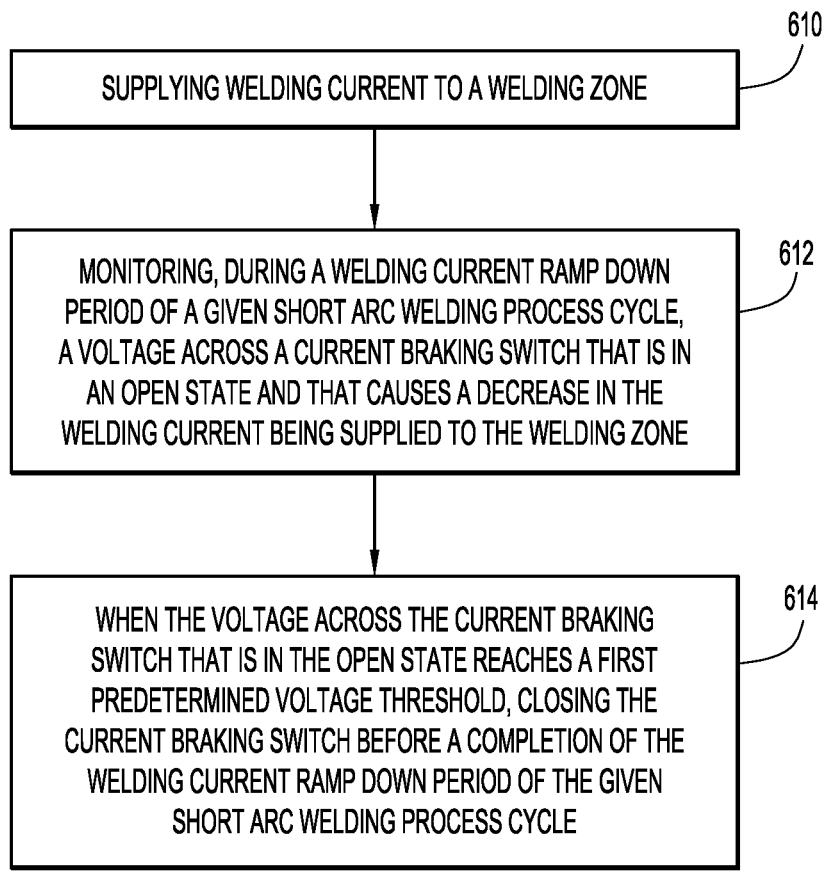
FIG. 6 is a flowchart depicting a series of operations for operating the switch control circuit according to an example embodiment.

FIG. 6 is a flowchart depicting a series of operations for operating the switch control circuit according to an example embodiment. At 610, a power supply supplies welding current to a welding zone. At 612, an operation monitors, during a welding current ramp down period of a given short arc welding process cycle, a voltage across a current braking switch that is in an open state and that causes a decrease in welding current being supplied to a welding zone. And, at 614, when the voltage across the current braking switch that is in the open state reaches a first predetermined voltage threshold, an operation closes the current braking switch before a completion of the welding current ramp down period of the given short arc welding process cycle.

To summarize, in one form, a method is provided and includes supplying a welding current to a welding zone, monitoring, during a welding current ramp down period of a given short arc welding process cycle, a voltage across a current braking switch that is in an open state and that causes a decrease in the welding current being supplied to the welding zone, and when the voltage across the current braking switch that is in the open state reaches a first predetermined voltage threshold, closing the current braking switch before a completion of the welding current ramp down period of the given short arc welding process cycle.

The first predetermined voltage threshold may be lower than a voltage rating of the current braking switch.

The method may also include causing the current braking switch to again be in the open state before the completion of the welding current ramp down period of the given short arc welding process cycle.

The method may also include monitoring a voltage across a clamping capacitor connected in parallel with the current braking switch, and causing the current braking switch to again be in the open state when the voltage across the clamping capacitor reaches a second predetermined voltage threshold.

Closing and opening the current braking switch may include controlling a gate terminal of the current braking switch.

The method may still also include determining whether a first output of a first comparator that represents the voltage across the current braking switch and a second output of a second comparator that represents the voltage across the clamping capacitor are both high, and when the first output and the second output are high generating a control signal for the gate terminal that causes the current braking switch to open.

The method may also include closing and opening the current braking switch more than one time before the completion of the welding current ramp down period of the given short arc welding process cycle.

The second predetermined voltage threshold may be about 45V across the clamping capacitor, and the first predetermined voltage threshold may be about 180V.

In an embodiment, the method is executed in a welding power supply.

In another form an apparatus is provided and includes a power supply that is configured to supply a welding current to a welding zone, and a brake switch voltage monitoring circuit configured to: monitor, during a welding current ramp down period of a given short arc welding process cycle, a voltage across a current braking switch that is in an open state and that causes a decrease in the welding current being supplied to the welding zone, and when the voltage across the current braking switch that is in the open state reaches a first predetermined voltage threshold, close the current braking switch before a completion of the welding current ramp down period of the given short arc welding process cycle.

The first predetermined voltage threshold may be lower than a voltage rating of the current braking switch.

The apparatus may also include a capacitor voltage monitoring circuit configured to cause the current braking switch to again be in the open state before the completion of the welding current ramp down period of the given short arc welding process cycle.

The capacitor voltage monitoring circuit may be configured to monitor a voltage across a clamping capacitor connected in parallel with the current braking switch, and cause the current braking switch to again be in the open state when the voltage across the clamping capacitor reaches a second predetermined threshold.

The apparatus may be configured to cause the current braking switch to close and open by controlling a gate terminal of the current braking switch.

In an embodiment, the apparatus further includes a first comparator having a first output that represents the voltage across the current braking switch and a second comparator having a second output that represents the voltage across the clamping capacitor, and the apparatus is further configured to combine the first output and the second output to obtain a combined output that is used to drive a control signal for the gate terminal.

The apparatus may also be configured to close and open the current braking switch more than one time before the completion of the welding current ramp down period of the given short arc welding process cycle.

In yet another form, an apparatus includes a power supply that is configured to supply a welding current to a welding zone, a brake switch voltage monitoring circuit configured to: monitor, during a welding current ramp down period of a given short arc welding process cycle, a voltage across a current braking switch that is in an open state and that causes a decrease in the welding current being supplied to the welding zone, and when the voltage across the current braking switch that is in the open state reaches a first predetermined voltage threshold, close the current braking switch before a completion of the welding current ramp down period of the given short arc welding process cycle, and a capacitor voltage monitoring circuit configured to cause the current braking switch to again be in the open state before the completion of the welding current ramp down period of the given short arc welding process cycle.

The apparatus may also include a switch control signal generation circuit in communication with the brake switch voltage monitoring circuit and the capacitor voltage monitoring circuit, and configured to output a gate control signal to control operation of the current braking switch.

The apparatus may also be configured to close and open the current braking switch more than one time before the completion of the welding current ramp down period of the given short arc welding process cycle.

Although the techniques are illustrated and described herein as embodied in one or more specific examples, the specific details of the examples are not intended to limit the scope of the techniques presented herein, since various modifications and structural changes may be made within the scope and range of the invention. In addition, various features from one of the examples discussed herein may be incorporated into any other examples. Accordingly, the appended claims should be construed broadly and in a manner consistent with the scope of the disclosure.

What is claimed is:

1. A method comprising:
supplying a welding current to a welding zone;
monitoring, during a welding current ramp down period of a given short arc welding process cycle, a voltage across a current braking switch that is in an open state and that causes a decrease in the welding current being supplied to the welding zone;
when the voltage across the current braking switch that is in the open state reaches a first predetermined voltage threshold, closing the current braking switch before a completion of the welding current ramp down period of the given short arc welding process cycle; and
causing the current braking switch to again be in the open state before the completion of the welding current ramp down period of the given short arc welding process cycle,
wherein the welding current ramp down period of the given short arc welding process cycle begins upon detecting a predetermined increase in arc voltage over time between an end portion of a welding wire and a workpiece and ends upon detecting a fuse of molten metal from the end portion of the welding wire, and
wherein the welding current ramp down period of the given short arc welding process cycle is less than 0.3 ms.

2. The method of claim 1, wherein the first predetermined voltage threshold is lower than a voltage rating of the current braking switch.

3. The method of claim 1, further comprising monitoring a voltage across a clamping capacitor connected in parallel, along with a diode, with the current braking switch; and
causing the current braking switch to again be in the open state when the voltage across the clamping capacitor reaches a second predetermined voltage threshold.

4. The method of claim 3, wherein closing and opening the current braking switch comprises controlling a gate terminal of the current braking switch.

5. The method of claim 4, further comprising determining whether a first output of a first comparator that represents the voltage across the current braking switch and a second output of a second comparator that represents the voltage across the clamping capacitor are both high; and
when the first output and the second output are high generating a control signal for the gate terminal that causes the current braking switch to open.

6. The method of claim 4, further comprising closing and opening the current braking switch more than one time before the completion of the welding current ramp down period of the given short arc welding process cycle.

7. The method of claim 3, wherein the second predetermined voltage threshold is about 45V across the clamping capacitor.

8. The method of claim 1, wherein the first predetermined voltage threshold is about 180V.

9. The method of claim 1, further comprising executing the method in a welding power supply.

10. A method comprising:
supplying a welding current to a welding zone, the welding current being consistent with a short arc welding process;
monitoring, during a welding current ramp down period of a given short arc welding process cycle, a voltage across a current braking switch that is used to decrease an amount of welding current being supplied to the welding zone;
in response to the voltage across the current braking switch, turning off and on the current braking switch at least two times during the welding current ramp down period of the given short arc welding process cycle,
wherein the welding current ramp down period of the given short arc welding process cycle begins upon detecting a predetermined increase in arc voltage over time between an end portion of a welding wire and a workpiece and ends upon detecting a fuse of molten metal from the end portion of the welding wire, and
wherein a length of time for the welding current ramp down period of the given short arc welding process cycle is less than 0.3 ms.

11. The method of claim 10, further comprising turning on the current braking switch before the voltage across the current braking switch exceeds a voltage rating of the current braking switch.

12. The method of claim 10, further comprising monitoring a voltage across a clamping capacitor connected in parallel, along with a diode, with the current braking switch; and
causing the current braking switch to turn off when the voltage across the clamping capacitor reaches a predetermined voltage threshold.

13. The method of claim 12, wherein turning off and on the current braking switch comprises controlling a gate terminal of the current braking switch.

14. The method of claim 13, further comprising determining whether a first output of a first comparator that represents the voltage across the current braking switch and a second output of a second comparator that represents the voltage across the clamping capacitor are both high; and
when the first output and the second output are high generating a control signal for the gate terminal that causes the current braking switch to open.

15. The method of claim 12, wherein the predetermined voltage threshold is about 45V across the clamping capacitor.

16. The method of claim 10, turning on the current braking switch when the voltage across the current braking switch is about 180V.

17. The method of claim 10, further comprising executing the method in a welding power supply.

* * * * *